Sept. 3, 1968  J. F. HUFF  3,400,287
FRICTIONLESS DRIVE

Filed Oct. 22, 1965  2 Sheets-Sheet 1

INVENTOR.
JOSEPH F. HUFF
BY
Kenway, Jenney & Hildreth
ATTORNEYS

Sept. 3, 1968          J. F. HUFF          3,400,287
FRICTIONLESS DRIVE
Filed Oct. 22, 1965          2 Sheets-Sheet 2
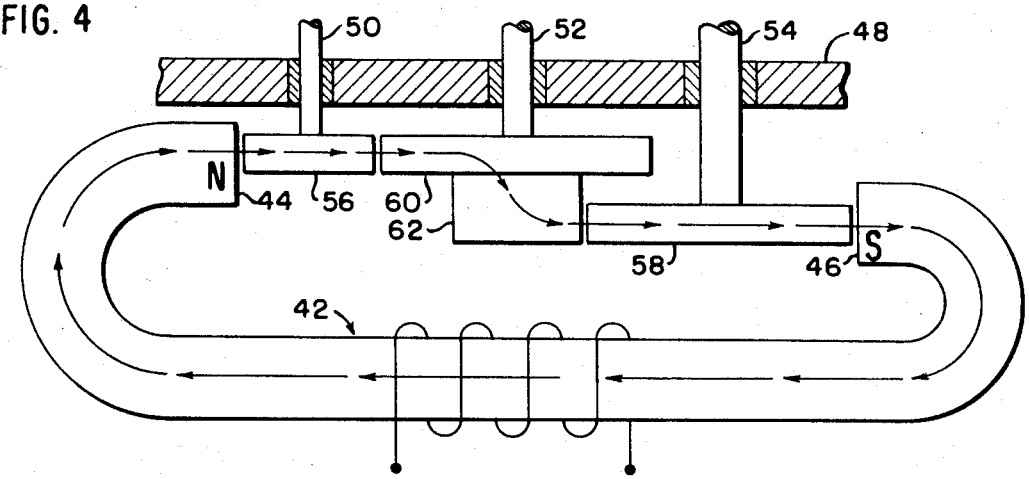
FIG. 4
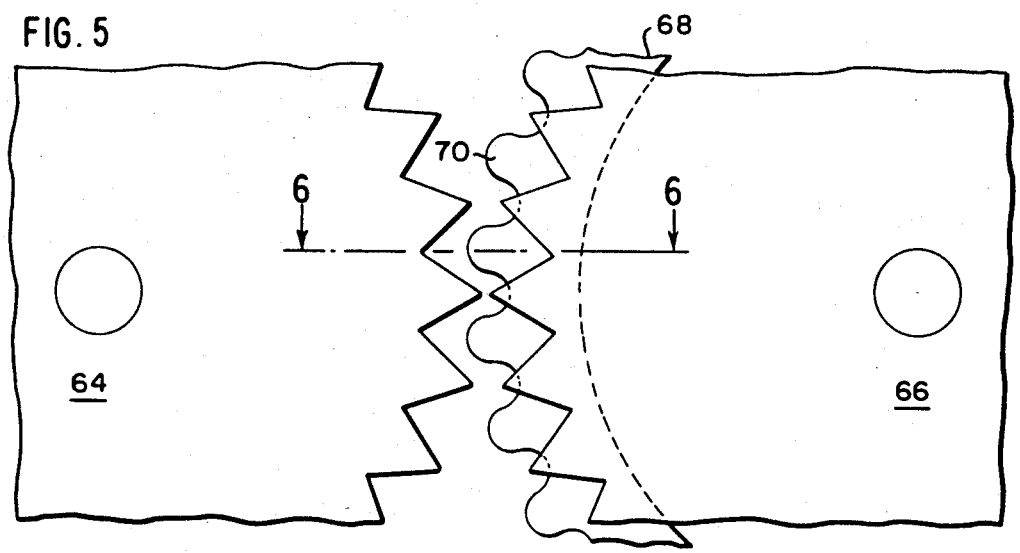
FIG. 5
FIG. 6
INVENTOR.
JOSEPH F. HUFF
BY
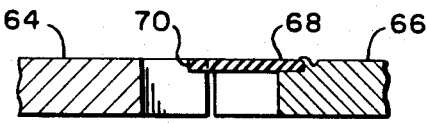
ATTORNEYS though the showing of the system is diagrammatic, the top view of FIG. 2 illustrates comparable structure and the description will be related to the two figures. A motor 12 may be mounted in any fashion as for example by screws upon the frame or bracket 14. The drive shaft 16 of the motor 12 extends through an opening or a suitable bushing in the bracket 14. On the end of the drive shaft 16 is a hub 18 which may be integral with or otherwise attached to a toothed disc 20. The disc 20 is made of a magnetic material such as soft iron, Alnico or other material of comparable magnetic characteristics.

United States Patent Office 3,400,287
Patented Sept. 3, 1968

3,400,287
FRICTIONLESS DRIVE
Joseph F. Huff, 72 Washington St.,
Hyde Park, Mass. 02136
Filed Oct. 22, 1965, Ser. No. 500,964
1 Claim. (Cl. 310—103)

ABSTRACT OF THE DISCLOSURE

A power transmission system in which a driving member and a driven member include teeth composed of magnetic material and in which a set of speed-change members composed of magnetic material are arranged for rotation between the driving member and the driven member. The speed-change members also have magnetic teeth and a source of magnetic flux is provided to energize a magnetic circuit which includes the driving member, the speed-change members and the driven member. The various teeth serve to concentrate magnetic flux at the points of separation between the various members.

---

This invention relates in general to the transmission of motion and mechanical power from one member to another and in particular to such transmission by magnetic means.

Various forms of magnetic drive or motion transmission have been developed in the past where the absence of contact or only minimum contact between driving and driven members is desired. Generally, such drive mechanisms are made up of discs of magnetized material on the peripheries of which opposing magnetic poles are formed. The attraction between the magnetic poles so formed is sufficient, under most circumstances, to cause the driven member to follow the driving member. A number of differing systems have been developed to provide the necessary magnetic force. In some instances, electromagnets have been utilized and in others permanent magnets have been employed. Also, systems have been produced in which magnetic members are interposed between the driving and driven members in such a fashion that motion is transmitted from the basic driving member to the driven member by way of the magnetic member.

Most of the systems of the prior art are subject to a fundamental objection. The attractive forces between members are generally so limited that no appreciable torque is available with the result that applications for the devices are limited. It is, therefore, a primary object of the present invention to accomplish power and motion transmission from one member to another efficiently and without contact between the driving and driven members.

Another object of the present invention is to eliminate friction and wear between members of a transmission system by maintaining the members out of contact with one another at all times.

A further object of the present invention is the elimination of backlash between members of a mechanical power transmission system.

A still further object of the present invention is to reduce the cost and simplify the fabrication of a transmission systems having neither wear nor friction.

Generally, the invention resides in a system in which driving and driven members are so constructed and disposed relative to one another that a concentration of flux is achieved at the point of separation of the members. The concentration of flux, however, permits the efficient and frictionless transmission of torque between the members. Various refinements of the mechanism for concentration of flux are also included in the present invention. For a better understanding of the invention, together with other and further objects, features and advantages reference should be made to the following specification which should be read in conjunction with the appended drawing, in which:

FIG. 4 is a view in section of an alternative embodiment of the invention wherein magnets are disposed at points remote from the point of torque transfer;

FIG. 5 is a fragmentary embodiment of the invention utilizing a non-magnetic ring;

FIG. 6 is a section taken through FIG. 4 along the lines 6—6.

Figure 1:
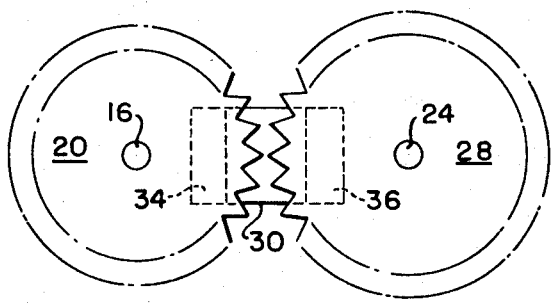
FIG. 1 is a diagrammatic representation of a simple transmission system incorporating the present invention.

In FIG. 1 there is illustrated diagrammatically a drive system utilizing principles of the present invention. Al- Also mounted in the bracket 14 by means of a suitable bushing 22 which is pressed into the bracket 14 is rotatable shaft 24. On the rotatable shaft 24 there is mounted a hub 26 which may be integral with or carry a toothed driven member 28. The size of the driving member 20 and the driven member 28 and the spacing of their shafts on the bracket 14 is such that the tips of the teeth approach each other as closely as possible. This spacing may be more clearly seen in FIG. 1. Also mounted upon the bracket 14 is a permanent magnet 30 having a north pole face 34 adjacent to the surface of the driving member 20 and a south face 36 adjacent the surface of the driven member 28. The spacing between the two pole faces and the driving and driven members is also as close as possible. The minimum spacing is desirable to reduce the various air gaps to the least possible dimensions. In fact, operation is possible with the tips of the teeth of the driving and driven members in light contact. The same is true of the spacing between the pole faces and the driving and driven members, but generally a minimum air gap is preferred. With the structure shown, a magnetic circuit is completed from the driving member 20 through the magnet to the driven member 28. Obviously, the magnet can be reversed without affecting the operability of the magnetic circuit.

Figure 3:
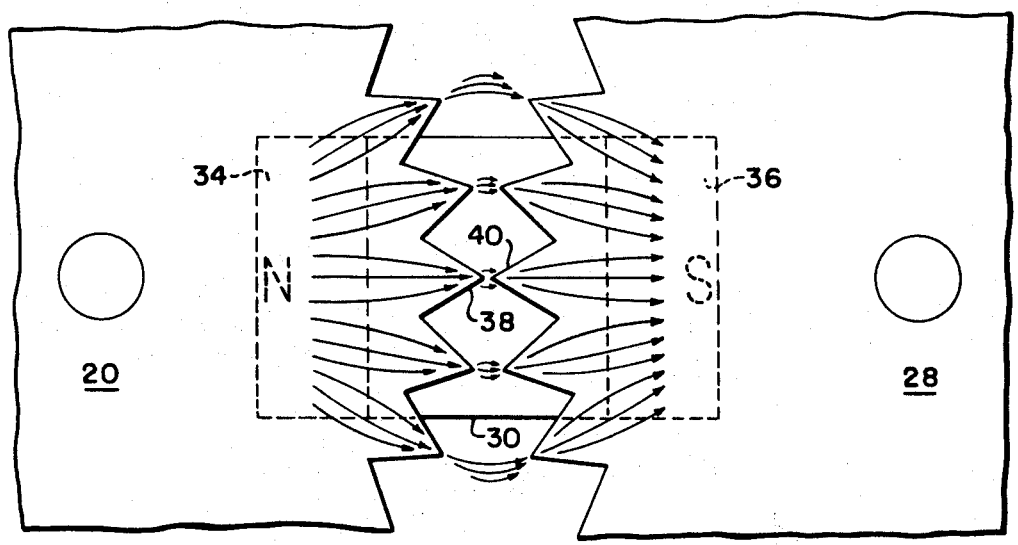
FIG 3 is an enlargement of a fragmentary portion of FIG. 1 showing flux distribution.

The operation of the transmission system may best be understood by referring to FIG. 3. As the driving member 20 is rotated by the motor 12, there is a concentration of flux at the most closely adjacent tooth tips, the tips 38 and 40 as seen in FIG. 3. With the concentration present at a central position, as shown, self-centering operation results. In other words, as the driving member 20 is rotated the driven member 28 follows the rotation of the driving member due to the attraction of the concentrated flux at the tips 38 and 40. With rotation the flux concentration in each tooth increases as matching teeth approach the center line on which the shafts 16 and 24 are rotated. Similarly, the flux concentration diminishes as the teeth rotate away from the center line. No cogging effects are encountered because the plurality of teeth of the driving and driven members permit a compensating dispersion of flux distribution with rotation of the members.

The permanent magnet 30 may be replaced by an electromagnet not only to transmit power in the manner shown and described but also to permit operation of the system as an electromagnetic clutch. Clutching action would most easily be achieved by allowing the motor 12 to rotate the driving member 20 continuously and energizing or de-energizing the electromagnet to affect torque transmission between the driving member 20 and the driven member 28. Also, in applications where a variation of transmitted torque is desired, the torque may be varied by varying the excitation of the electromagnet to vary its field strength.

Figure 2:
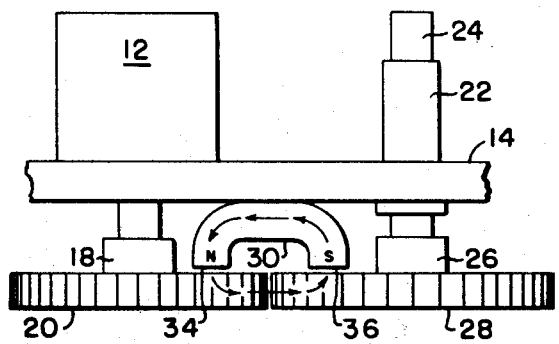
FIG. 2 is a top view of a system built along the lines of the representation of FIG. 1.

In FIG. 4 an alternative embodiment of the invention is shown in which the pole faces of the magnet are disposed at points remote from the points of concentration of flux between driving and driven members. A magnet 42, shown as an electromagnet is provided with pole faces 44 and 46. The magnet may, of course, be of the permanent type. A bracket or frame 48 is provided with openings in which suitable bushings may be fixed and through which the shafts 50, 52 and 54 pass. The shaft 50, for example, may be connected to a motor such as the motor 12 of FIG. 2 or to any other suitable driving device. Mounted on the shaft 50 is a toothed driving disc 56 and mounted on the shaft 54 is a tooth driven disc 58. Between driving and driven members is a reducing mechanism composed of a pair of concentric discs 60 and 62. All of the discs 56, 58, 60 and 62 are made of magnetic material. Because the disc 62 is of smaller diameter than the disc 60 and because the driving member 56 is of smaller diameter than the driven member 58, a speed change is achieved between driving and driven members. Obviously, various disc sizes may be utilized to effect different speed changes. More important in relevancy to the present invention, however, is the flux path set up between the pole faces of the magnet 42. The magnetic circuit is completed from one pole face to the other through the discs 56, 60, 62 and 58. The same conditions of minimum gap or slight contact between components of the magnetic circuit as those which obtained in the system of FIG. 2 are also utilized in the present transmission system.

FIGS. 4 and 5 illustrate an embodiment of the invention by which slippage of a tooth may occur between the driving and driven members. Generally, the possibility of such slippage is slight. However, in certain applications such as counting or timing mechanisms positive protection against slippage is required as for example when an overload occurs as the result of a sudden start or heavy loading of the system.

The general structure of magnetic torque transfer previously described is retained between the driving member 64 and the driven member 66. However, a ring 68 may be staked to either the driving or driven member although it is shown in the drawing as being staked to the driven member 66. The ring is preferably made of non-magnetic material and is provided with a plurality of rounded teeth 70 which are disposed relative to the magnetic teeth in positions where no interference with flux-concentrating teeth of the driving and driven members will be encountered. In the illustrated embodiment, a tooth of the ring 68 is disposed between each pair of adjacent teeth of the driven member 66. In the event that slippage occurs, the teeth will cam the teeth of the driving and driven members back into alignment when the overload ceases. The teeth 70 need not be of the precise shape illustrated but the rounded contour is desirable to minimize friction and wear.

Although what has been described and shown constitutes preferred embodiments of the present invention, alternative structures within the purview of the present invention will suggest themselves to those skilled in the art upon a reading of the foregoing. Accordingly, the invention should not be limited to the exact structures shown but only by the spirit and scope of the appended claim.

What is claimed is:

1. In a power transmission system having a driving member disposed for rotation and a driven member disposed for rotation, the combination of a first plurality of teeth composed of magnetic material formed on the periphery of said driving member, a second plurality of teeth composed of magnetic material formed on the periphery of said driven member, a set of speed-change members composed of magnetic material and disposed for rotation between said driving member and said driven member, said speed-change members being provided with predetermined pluralities of teeth differing in number from at least one of said first and said second plurality, a source of magnetic flux disposed in magnetic series circuit relationship with said driving member, said speed-change members and said driven member whereby magnetic flux flows therethrough, and means for rotating said driving member to bring successive ones of said first plurality of teeth into juxtaposition with successive ones of said predetermined pluralities of teeth of said speed-change member, other successive ones of said teeth of said speed-change member being juxtaposed with successive ones of said second plurality of teeth of said driven member to concentrate said magnetic flux at the point of separation of said driving member and said speed-change member and at the point of separation of said speed-change member and said driven member to transfer torque from said driving member to said driven member.

References Cited

UNITED STATES PATENTS 3,301,091   1/1967   Reese _____ 310—103 X

FOREIGN PATENTS 1,087,275   8/1960   Germany.

ROBERT K. SCHAEFER, *Primary Examiner.*

HERMAN O. JONES, *Assistant Examiner.*